US010906363B2

(12) United States Patent
Yu et al.

(10) Patent No.: US 10,906,363 B2
(45) Date of Patent: Feb. 2, 2021

(54) WARRANT RECORDING SYSTEM AND SETTING APPARATUS FOR PRESSURE DETECTOR

(71) Applicant: CUB ELECPARTS INC., Changhua County (TW)

(72) Inventors: San-Chuan Yu, Changhua County (TW); Chao-Ching Hu, Changhua County (TW); Li-Li Chen, Changhua County (TW); Ya-Ling Chi, Changhua County (TW)

(73) Assignee: CUB ELECPARTS INC., Fuxing Township (TW)

( * ) Notice: Subject to any disclaimer, the term of this patent is extended or adjusted under 35 U.S.C. 154(b) by 386 days.

(21) Appl. No.: 15/946,175

(22) Filed: Apr. 5, 2018

(65) Prior Publication Data

US 2019/0160894 A1 May 30, 2019

(30) Foreign Application Priority Data

Nov. 24, 2017 (TW) .............................. 106141067 A

(51) Int. Cl.
*B60C 23/04* (2006.01)
*G01L 17/00* (2006.01)
(52) U.S. Cl.
CPC ...... *B60C 23/0479* (2013.01); *B60C 23/0471* (2013.01); *B60C 23/0488* (2013.01); *G01L 17/00* (2013.01); *B60C 23/0462* (2013.01)

(58) Field of Classification Search
None
See application file for complete search history.

(56) References Cited

U.S. PATENT DOCUMENTS

| 2007/0222568 | A1* | 9/2007 | Morar | G07C 5/085 |
| | | | | 340/447 |
| 2009/0145216 | A1* | 6/2009 | Huang | B60C 23/0408 |
| | | | | 73/146.5 |
| 2015/0015387 | A1* | 1/2015 | McIntyre | B60C 23/0472 |
| | | | | 340/447 |

FOREIGN PATENT DOCUMENTS

GB          2500697 A  * 10/2013  ......... B60C 23/0461

* cited by examiner

*Primary Examiner* — Gregory J Toatley, Jr.
*Assistant Examiner* — Terence E Stifter, Jr.
(74) *Attorney, Agent, or Firm* — Muncy, Geissler, Olds & Lowe, PC

(57) ABSTRACT

A warrant recording system includes a setting apparatus and a tire pressure detector. The setting apparatus is connected with the internet for acquiring a standard time. The setting apparatus writes the acquired standard time into the tire pressure detector, such that an initial timestamp is recorded in the tire pressure detector. Therefore, the setting apparatus automatically inputs a warrant period into the tire pressure detector, thus assuring the accurate record of the initial time point of the warrant period.

11 Claims, 7 Drawing Sheets

WARRANT RECORDING SYSTEM AND SETTING APPARATUS FOR PRESSURE DETECTOR

BACKGROUND OF THE INVENTION

1. Field of the Invention

The present invention relates to tire pressure detectors, and more particularly, to a warrant recording system and setting apparatus capable of automatically recording a standard time into the tire pressure detector.

2. Description of the Related Art

For improving vehicle and driving security, tire pressure detectors are installed in a vehicle for measuring statistics including tire pressure and temperature of each wheel before or during driving process, so as to assure the driving security of the driver and passengers.

During the installation of the tire pressure detector, the technician needs to put the tire pressure detector into a program burning status by use of a burning tool, and sets up the tire pressure detector to store the communication protocol or other parameters. After that, the tire pressure detector is installed at the vehicle tire.

When the installation of the tire pressure detector is finished, the manufacturer provides warrant and maintenance services for the tire pressure detector. Therefore, when the tire pressure detector meeting the service requirement is malfunctioned or damaged, the customer have the right to accept a warrant or maintenance service without charge.

The warrant date is mainly recorded with two methods. First, the technician records the installation date at the warranty certificate which is handed to the customer. Second, when setting the tire pressure detector to save the communication protocol or other parameters in the tire pressure detector, the technician manually enters the installation date.

Regarding the first recording method, the written recording process is easily carried out. However, written error or blurred handwriting easily occurs. As a result, a controversy of installation date identification afterward is easily caused. Also, the warranty certificate may possibly be lost, such that the installation date is not checkable, and the warrant controversy is thereby caused.

Regarding the second method, although the record is saved in the tire pressure detector and prevented from lost and handwriting blur, the burning tool is operated by a person, and the installation date is entered manually, failing to meet a convenience of usage. Also, the installation date may be incorrectly entered or even forgotten to be entered. Therefore, relative controversy still possibly occurs regarding the maintenance warrant afterward.

SUMMARY OF THE INVENTION

For improving the issues above, a warrant recording system and setting apparatus in accordance with an embodiment of the present invention are disclosed. By acquiring the standard time with the setting apparatus through the internet and recording the standard time into the tire pressure detector, an initial timestamp is automatically recorded, so as to prevent the error of the warrant time record, achieving a complete warrant service.

An embodiment of the present invention provides a warrant recording system, comprising:

a setting apparatus provided with a communication unit, a control unit, and a reading and writing unit, the communication unit further connected with internet for acquiring a standard time; and a tire pressure detector signally connected with the setting apparatus, the tire pressure detector including a central processing unit, an information storing unit, and an air pressure detection unit; the central processing unit is coupled with the information storing unit and the air pressure detection unit, wherein the setting apparatus receives the standard time through the communication unit and writes the standard time into the information storing unit through the reading and writing unit, such that an initial timestamp is recorded by the information storing unit.

With such configuration, when installing and setting the tire pressure detector, the setting apparatus is connected with the internet to acquire the standard time, and the standard time is written into the tire pressure detector by the setting apparatus, such that the tire pressure detector stores the initial timestamp corresponding to the standard time. Therefore, the warrant time period is recorded in the tire pressure detector automatically, thereby preventing the error occurring by conventional recording method and avoiding the consumption controversy. A complete warrant service is achieved.

In an embodiment of the present invention, the setting apparatus includes a database unit coupled with the control unit. The database unit stores a tire pressure detection setting data. The setting apparatus receives the standard time through the communication unit and writes the tire pressure detection setting data and the standard time simultaneously into the information storing unit through the reading and writing unit. The initial timestamp is the standard time corresponding to the time of the tire pressure detection setting data being written into the information storing unit. Therefore, the data record is accurately assured.

In an embodiment of the present invention, the initial timestamp is recorded in the information storing unit in a read-only form. Therefore, the recorded initial timestamp is prevented from being revised or covered, so as to assure the accuracy of the warrant time record.

In an embodiment of the present invention, a statistics label is further included, which is disposed at a vehicle tire, wherein a tire information of the vehicle tire is saved in the statistics label. The setting apparatus further includes a transmission unit coupled with the control unit for sensing the statistics label to acquire the tire information, such that the control unit transmits and saves the tire information into the information storing unit through the reading and writing unit. With such configuration, by connection of the setting apparatus and the statistics label, the tire information is efficiently read and written into the tire pressure detector automatically. Therefore, possibly occurring errors caused by conventionally manual operation is prevented, such that the setting and information are assured to be recorded in the tire pressure detector.

In an embodiment of the present invention, the tire pressure detector is installed at a vehicle tire. The tire pressure detector includes a sensing unit and a calculation unit. The calculation unit is signally connected with the information storing unit. The sensing unit senses the rotation of the tire during the vehicle movement, so as to generate a sense signal. The calculation unit receives the sense signal for calculating to generate a mileage information which is stored in the information storing unit. Therefore, by recording the installation date and calculating the warrant with mileage information, the user is allowed to choose an appropriate warrant service, so as to achieve a multi-dimensional and complete warrant function.

DETAILED DESCRIPTION OF THE INVENTION

Figure 1:
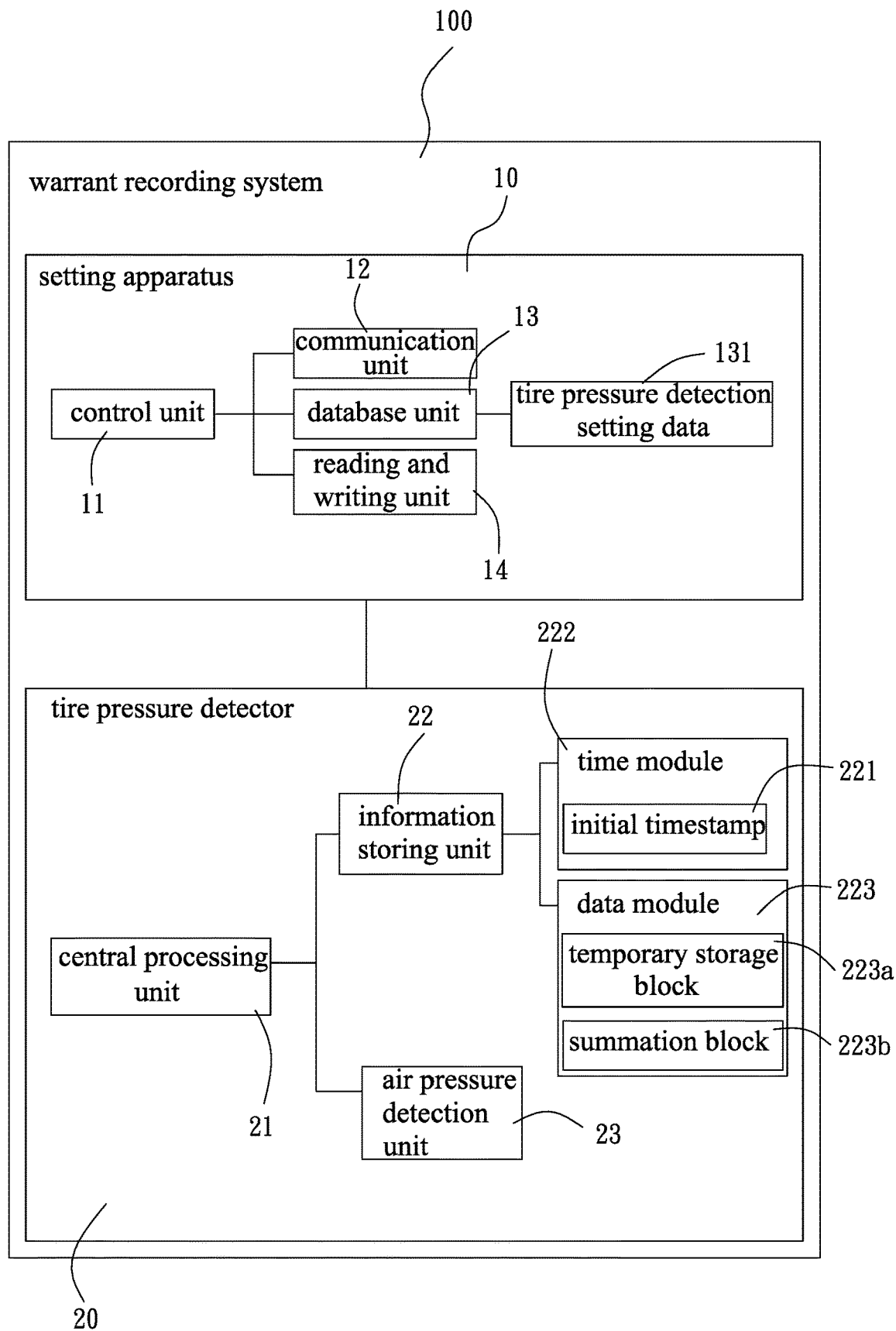
FIG. 1 is a schematic view illustrating the system structure in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The terms "a", "an", and "the" presented in a singular form, unless clearly indicated to be otherwise in the context, also include the embodiment with plurality forms. In the specification, the terms "be provided', "include", and "comprise" indicate that the cited technical features, components, and/or assemblies are included without exclusions of one or more other technical features, components, and/or assemblies.

Further, when a first component is described to be "disposed on", "electrically connected with" or "coupled with" a second component, the embodiment includes that the first component is allowed to be directly disposed on, electrically connected with, or coupled with the second component, or that the an intermediate component exists between the first and second components. In contrast, when a first component is descried to be "directly disposed on", "directly electrically connected with", or "directly coupled with" a second component, no other intermediate components exist between the first and second components. In the drawings, same numeric refer to identical components. The term "and/or" includes the embodiment of all possible combinations of the related items.

Figure 2:
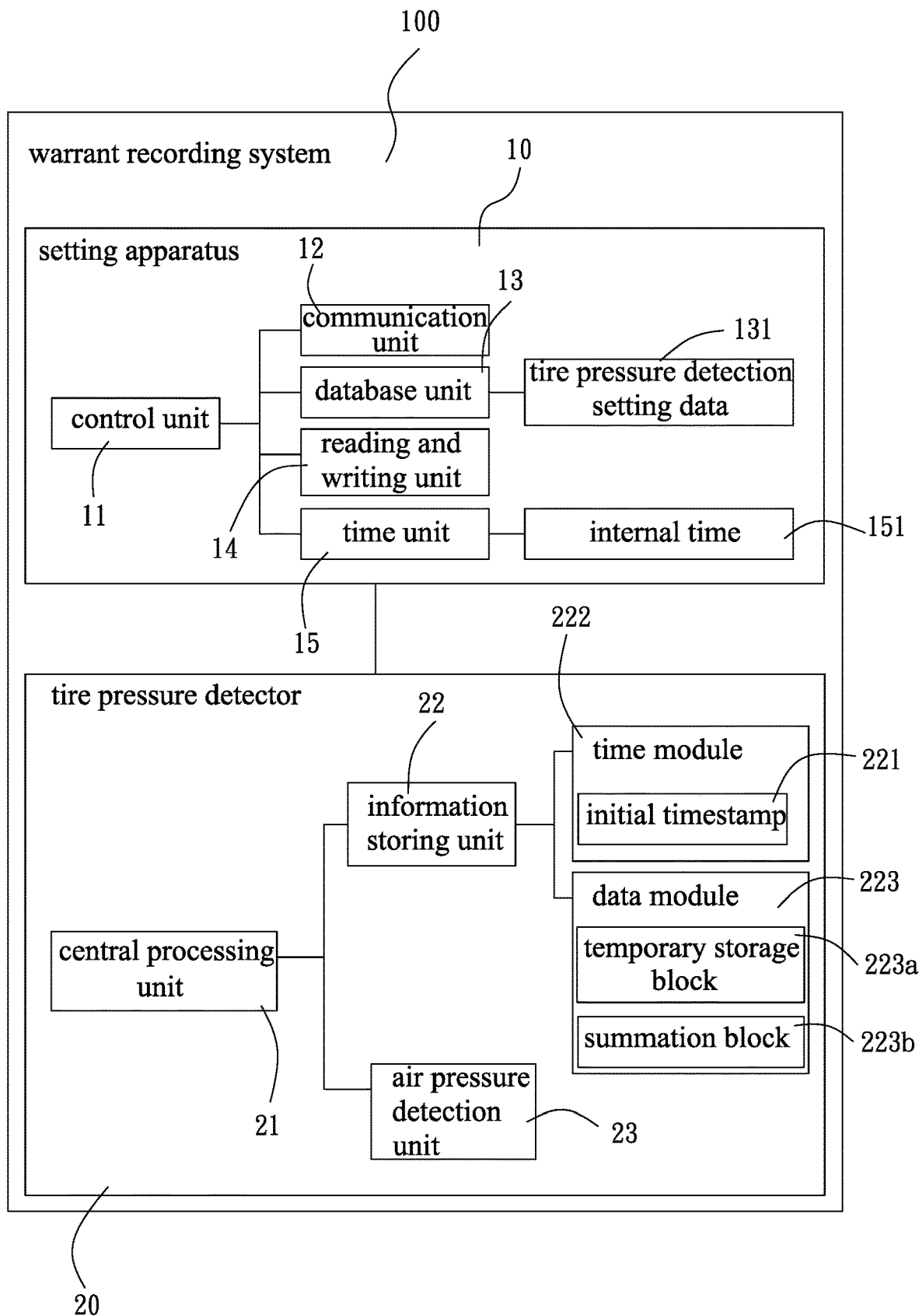
FIG. 2 is a schematic view illustrating the system structure in accordance with another embodiment of the present invention.
Figure 3:
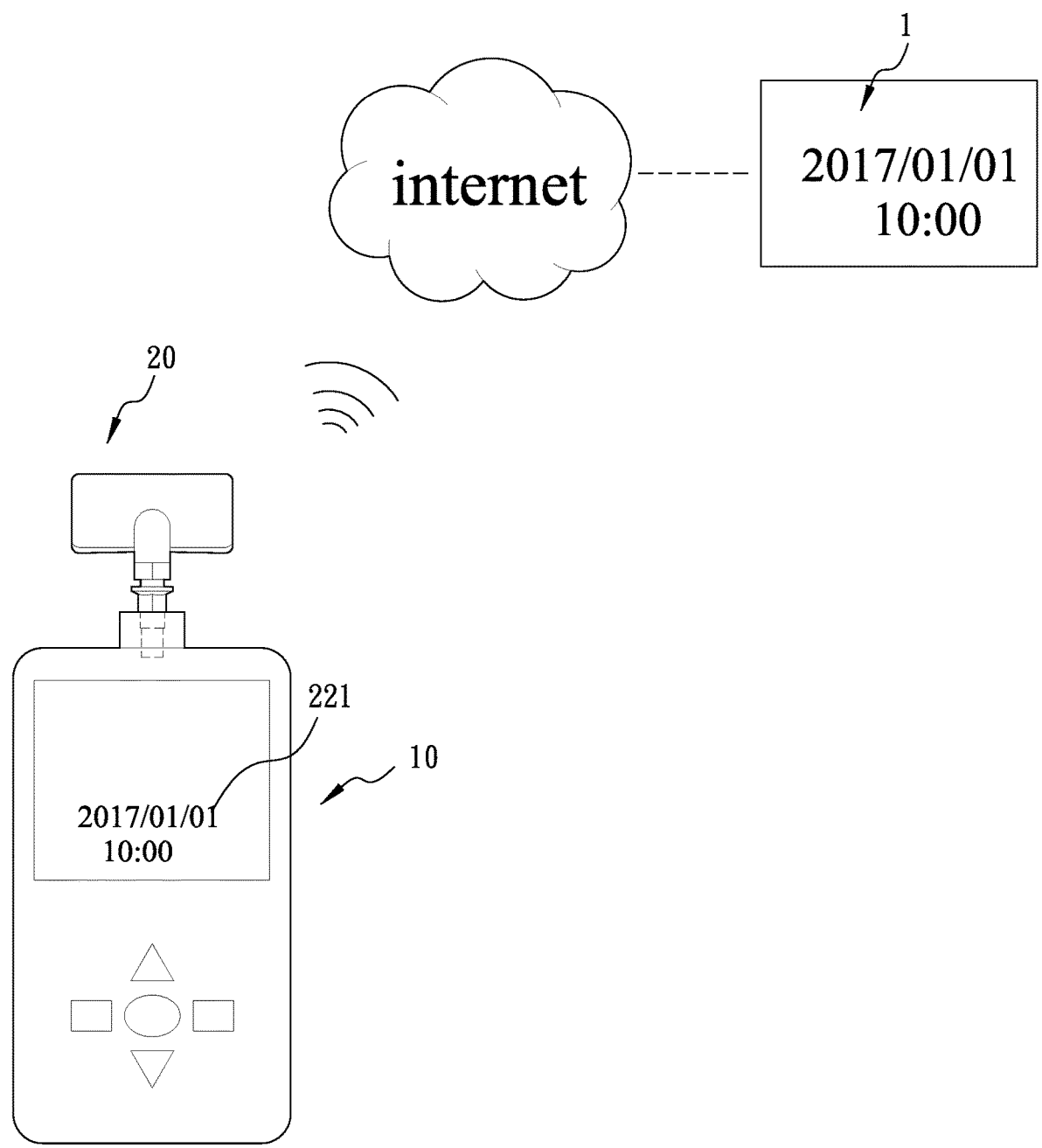
FIG. 3 is a schematic view illustrating the setting apparatus receiving the standard time and writing the standard time into the tire pressure detector.

Referring to FIG. 1 to FIG. 3, a warrant recording system 100 in accordance with an embodiment of the present invention is provided, comprising a setting apparatus 10 and a tire pressure detector 20 which is signally connected with the setting apparatus 10. In an embodiment of the present invention, the tire pressure detector 20 and the setting apparatus 10 are electrically connected in a wire connection. The setting apparatus 10 acquires a standard time 1 through the internet, and writes the standard time 1 into the tire pressure detector 20 to be stored therein, so as to assure that the timing of the warrant period is accurately recorded.

The setting apparatus 10 includes a control unit 11, a communication unit 12, a database unit 13, and a reading and writing unit 14. The communication unit 12 is connected with the internet for acquiring the standard time 1. The communication unit 12 sends the standard time 1 which is acquired online to the control unit 11. In an embodiment of the present invention, the standard time 1 refers to the Coordinated Universal Time (UTC) corresponding to each time zone. More specifically, the communication unit 12 is connected with the internet and acquires the Coordinated Universal Time corresponding to the time zone where the user operates the setting apparatus 10 as the standard time 1, which is sent to the control unit 11.

Further, the database unit 13 stores a tire pressure detection setting data 131. The database unit 13 is able to send the tire pressure detection setting data 131 to the control unit 11. The tire pressure detection setting data 131 includes the information of the communication protocol, the system communication protocol, and the size and model of the tire 2 corresponding to a specific vehicle model of a specific vehicle brand.

Also, the reading and writing unit 14 is applied for reading the data or writing the data into the tire pressure detector 20. In an embodiment of the present invention, when the tire pressure detector 20 and the setting apparatus 10 are electrically connected, the setting apparatus 10 acquires the standard time 1 through the communication unit 12 and sends the standard time 1 to the control unit 11; or, the database unit 13 sends the tire pressure detection setting data 131 to the control unit 11. Therefore, the standard time 1 or the tire pressure detection setting data 131 is able to be written in the tire pressure detector 20 through the reading and writing unit 14.

In another embodiment of the present invention, referring to FIG. 2 and FIG. 3, the setting apparatus 10 includes a time unit 15, which is coupled with the control unit 11 and the communication unit 12. The time unit 15 is a physical clock (Atomic Clock) which applies a calculation crystal for calculation through the atomic oscillation period. The time unit 15 is provided with an internal time 151, which is applied as a time for the setting apparatus 10. When the setting apparatus 10 sends the standard time 1 acquired online through the communication unit 12 to the control unit 11, the control unit 11 sends the standard time 1 to the time unit 15, wherein the internal time 151 of the time unit 15 is calibrated and updated, such that the internal time 151 accurately corresponds to the online standard time 1. Therefore, when the tire pressure detector 20 is electrically connected with the setting apparatus 10, the reading and writing unit 14 is allowed to write the internal time 151 of the time unit 15 into the tire pressure detector 20.

The tire pressure detector 20 is installed on the wheel tire 2, which is rotatably disposed on the vehicle 3. Also, the vehicle 3 refers to a car or motorcycle. In the present embodiment, the vehicle 3 is a car. The tire pressure detector 20 includes a central processing unit 21, an information storing unit 22, and an air pressure detection unit 23. The setting apparatus 10 acquires the standard time 1 through the communication unit 12, and sends the standard time 1 to the central processing unit 21 through the reading and writing unit 14, such that the standard time 1 is written into the information storing unit 22, and the information storing unit 22 records an initial timestamp 221. In an embodiment of the present invention, the initial timestamp 221 is recorded in the information storing unit 22 in a read-only form. Therefore, the initial timestamp 221 is unable to be overwritten. The air pressure detection unit 23 is applied for detecting the air pressure in the vehicle tire 2, so as to generate a pressure signal which is sent to the central processing unit 21.

In an embodiment of the present invention, the control unit 11 of the setting apparatus 10 is allowed to receive the tire pressure detection setting data 131 and the standard time 1 and send such information to the reading and writing unit 14. Then, the reading and writing unit 14 writes the tire pressure detection setting data 131 and the standard time 1 into the information storing unit 22 simultaneously. Meanwhile, the initial timestamp 221 refers to the online standard time 1 upon the tire pressure detection setting data 131 being written into the information storing unit 22.

Noticeably, usage of the term "simultaneously" indicates that during the time period of the user entering or burning the information into the tire pressure detector 20 through the setting apparatus 10, the tire pressure detection setting data 131 and the standard time 1 are written into the information storing unit 22 in a non-specific order, wherein either the standard time 1 or the tire pressure detection setting data 131 is allowed to be the first information written into the information storing unit 22. In other words, the tire pressure detection setting data 131 and the standard time 1 are not necessary to be sent and written into the information storing unit 22 at the "identical time point".

Further, the information storing unit 22 includes a time module 222 and a data module 223. The time module 222 is applied for saving the initial timestamp 221. The data module 223 is applied for saving the tire pressure detection setting data 131. Therefore, the setting apparatus 10 acquires the online standard time 1 through the communication unit 12 and stores the initial timestamp 221 of the warrant period in the tire pressure detector 20 automatically, so as to assure the correctness and accuracy of the initial time point of the warrant. Also, by storing the initial timestamp 221 in the tire pressure detector 20 in a read-only form, the initial timestamp 221 is prevented from being amended or overwritten.

Figure 4:
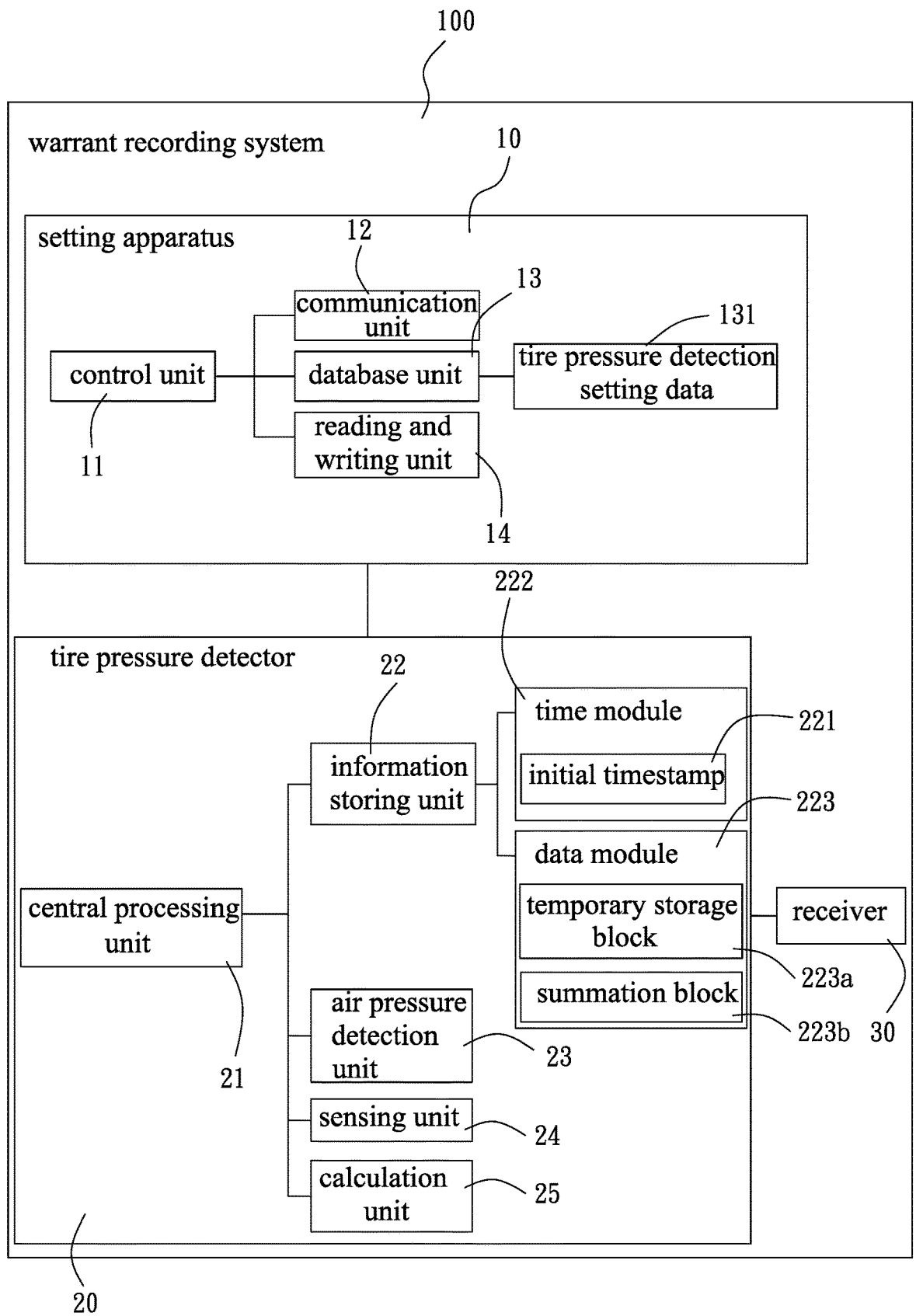
FIG. 4 is a schematic view illustrating the system structure in accordance with another embodiment of the present invention.
Figure 5:
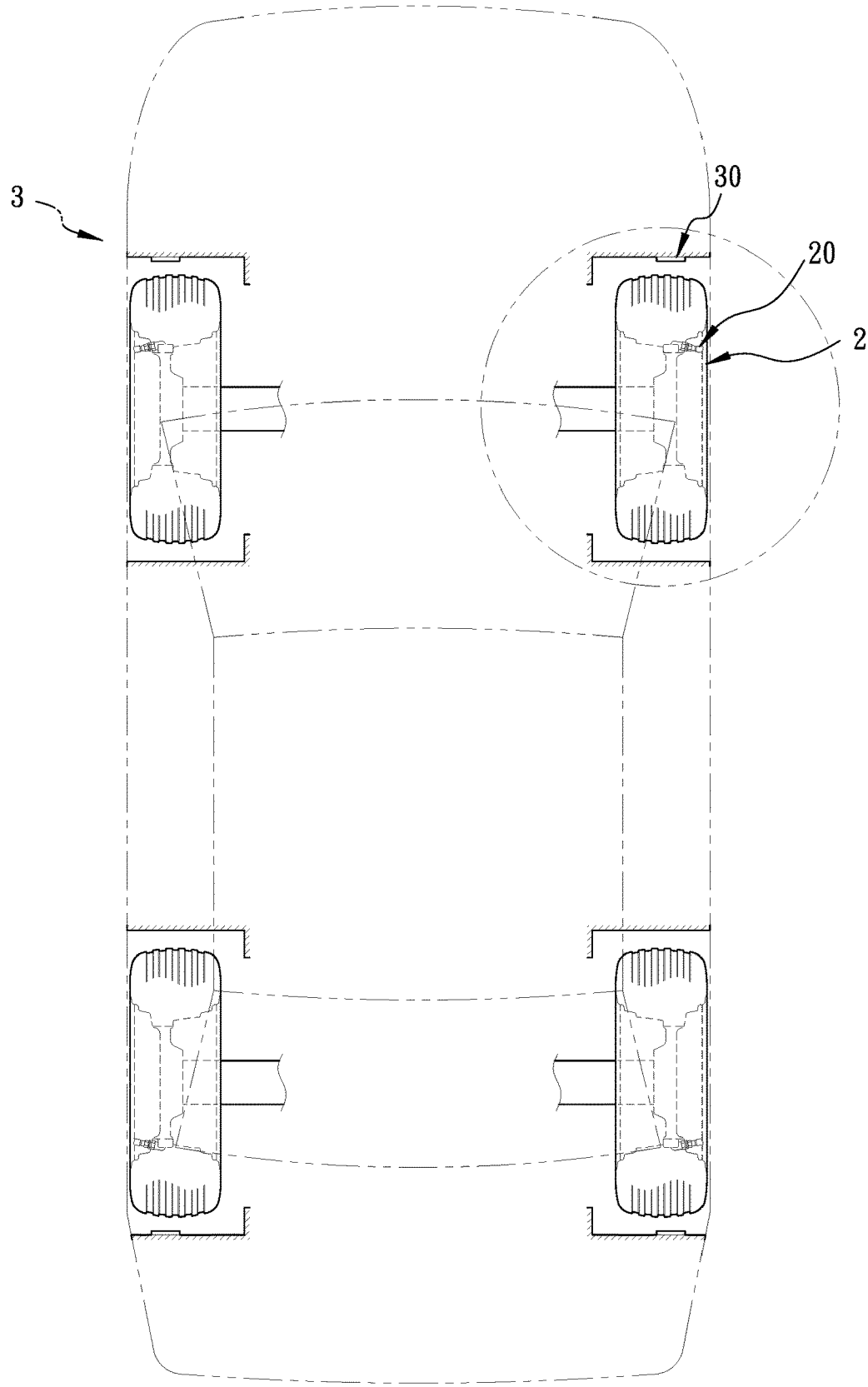
FIG. 5 is a schematic view illustrating the tire pressure detector disposed on a vehicle which is provided with a receiver.
Figure 6:
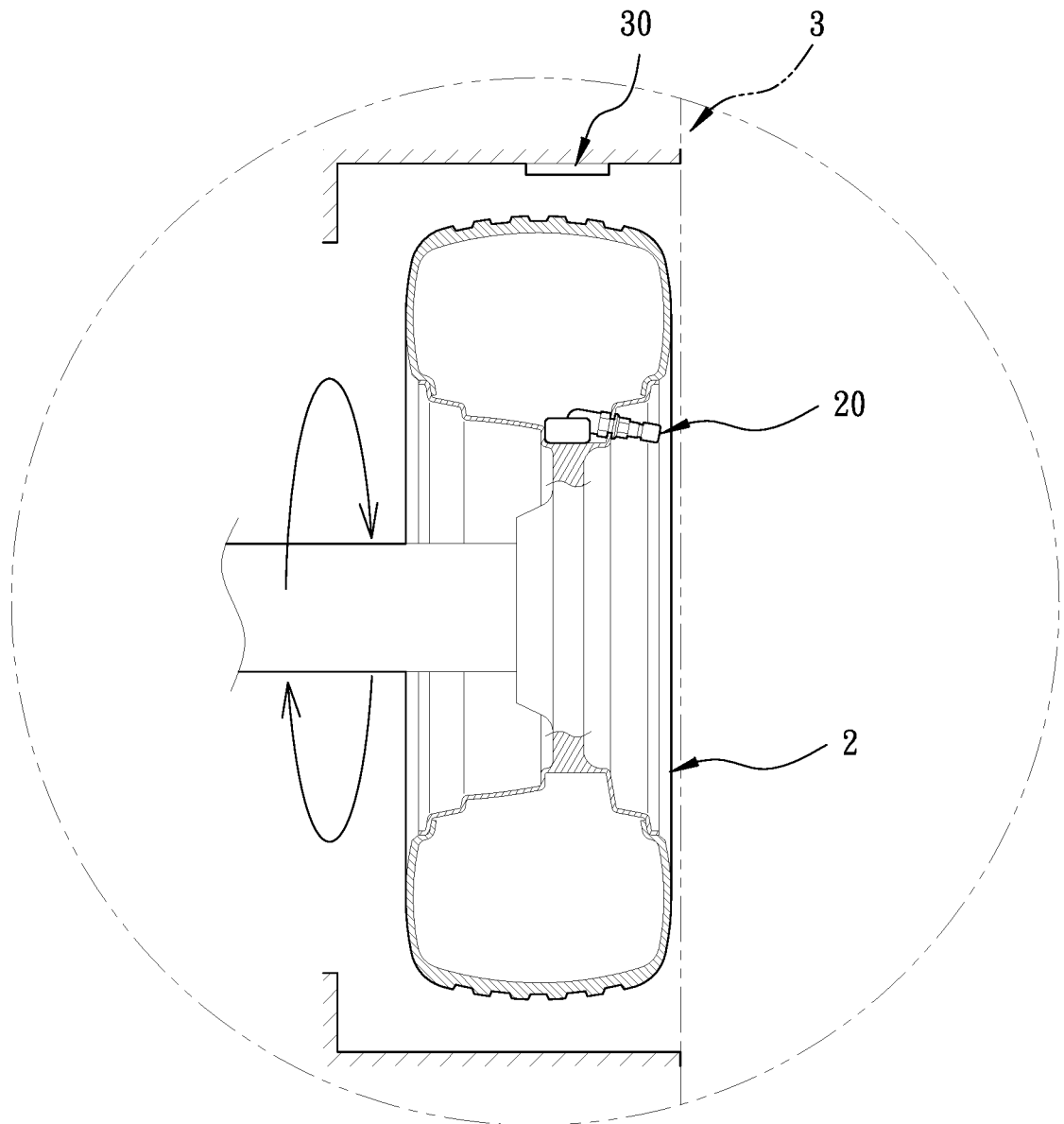
FIG. 6 is a partially enlarged view of the embodiment of FIG. 5.

Referring to FIG. 4 to FIG. 6, in another embodiment of the present invention, the tire pressure detector 20 further includes a sensing unit 24 and a calculation unit 25. The air pressure detection unit 23 and the sensing unit 24 are coupled with the central processing unit 21. The calculation unit 25 is coupled with the information storing unit 22.

The sensing unit 24 is applied for sensing the rotation of the vehicle tire 2 during the movement of the vehicle 3 to generate a sense signal. The sensing unit 24 sends the sense signal to the central processing unit 21, and the central processing unit 21 sends the sense signal to the calculation unit 25, such that the calculation unit 25 generates a mileage information according to the sense signal. Next, the calculation unit 25 sends the calculated mileage information to the central processing unit 21, and the central processing unit 21 sends the mileage information to data module 223 of the information storing unit 22 to be stored therein.

In an embodiment of the present invention, the mileage information is presented in a number value status. The mileage information is allowed to be the driving mile value of the vehicle 3 or the rotation laps value of the vehicle tire 2 during the movement of the vehicle 3. The data module 223 of the information storing unit 22 includes a temporary storage block 223a and a summation block 223b. The calculation unit 25 saves the calculated mileage information in the temporary storage block 223a. When the mileage information in the temporary storage block 223a is accumulated to reach a predetermined value, the accumulated mileage information is transferred to be saved in the summation block 223b in an arithmetic carry form, and the mileage originally saved in the temporary storage block 223a returns to zero. The predetermined value is allowed to be calculated in a unit of a kilo, mile, or other mileage value, or the rotation laps number of the vehicle tire 2 conducted in a one kilo or one mile distance. The arithmetic carry information is presented in an integral number value.

For example, when the mileage information refers to the driving mile value of the vehicle 3, the mileage information is calculated with following process. The calculation unit 25 calculates the rotation laps number of the vehicle tire 2 according to the sense signal generated by the sensing unit 24 and the size of the vehicle tire 2, and further calculates the mileage information with a calculation formula. Next, the calculation unit 25 sends the mileage information to the temporary storage block 223a. When the mileage information in the temporary storage block 223a is accumulated to reach one kilo, the mileage information is transformed into an arithmetic carry information to be saved in the summation block 223b. At the moment, the arithmetic carry information in the summation block 223b is presented as an integral Value 1, and the mileage information in the temporary storage block 223a returns to zero for receiving new mileage information from the calculation unit 25 afterward. When the mileage information in the temporary storage block 223a is accumulated to reach one kilo once again, the arithmetic carry information in the summation block 223b becomes an integral value 2.

In another example, for further saving the calculation energy of the tire pressure detector 20 to achieve a power saving function, the mileage calculation process is allowed to be carried out in the setting apparatus 10. For example, when the mileage information refers to the rotation laps value of the vehicle tire 2 of the vehicle 3, the mileage information is calculated with following process. The calculation unit 25 calculates the rotation laps number of the vehicle tire 2 according to the sense signal generated by the sensing unit 24. Next, the rotation laps number and the size of the vehicle tire 2 set up by the user are recorded in the data module 223. When the setting apparatus 10 carries out the measurement of the tire pressure detector 20, the control unit 11 of the setting apparatus 10 calculates the driving mile value according to the rotation laps number and the size of the vehicle tire 2 with a calculation formula.

Furthermore, the sensing unit 24 is allowed to be an accelerometer or a gyroscope. In the embodiment of the sensing unit 24 being an accelerometer, when the sensing unit 24 senses the movement of the vehicle 3 and the rotation of the vehicle tire 2, the sense signal is generated based on the variation of the three coordinate axes (X, Y, Z) or the two coordinate axes (X, Z), such that the calculation unit 25 calculates the mileage information based on the sense signal with a calculation formula. In the embodiment of the sensing unit 24 being a gyroscope, when the sensing unit 24 senses the rotation force generated by the rotation of the vehicle tire 2, the sensing unit 24 generates the sense signal according to the variation of the rotation inertia and the angular velocity, such that the calculation unit 25 calculates the mileage information based on such variation with the calculation formula.

In addition, the vehicle 3 is provided with a receiver 30, which is connected with the tire pressure detector 20 and the sensing unit 24. The receiver 30 is fixed to the bottom plate of the vehicle 3 in adjacent to the vehicle tire 2. When the vehicle tire 2 rotates, the receiver 30 and the sensing unit 24 of the tire pressure detector 20 face each other at a certain corresponding positions, so as to sense each other to generate the sense signal. The calculation unit 25 calculates the mileage information according to periodically received sense signal and the size of the vehicle tire 2. In an embodiment of the present invention, the receiver 30 is a magnet, and sensing unit 24 is a magnetic induction member.

More specifically, when the vehicle tire 2 rotates for one lap, the receiver 30 and the sensing unit 24 sense each other for one time and generate a sense signal. By acquiring the size of the vehicle tire 2 based on the tire pressure detection setting data 131 saved in the information storing unit 22 of the calculation unit 25, the calculation unit 25 transforms the size of the vehicle tire 2 into a peripheral length. Therefore, the calculation unit 25 calculates the mileage information according to the received sense signal and the peripheral length.

With such configuration, the present invention records the initial timestamp 221 corresponding to the installation date in the tire pressure detector 20 and calculates the mileage information. By providing different warrant duration presentation methods, the present invention allows the user to choose the appropriate warrant duration service according to the user demand. Therefore, a multi-dimensional and complete warrant service is achieved.

Figure 7:
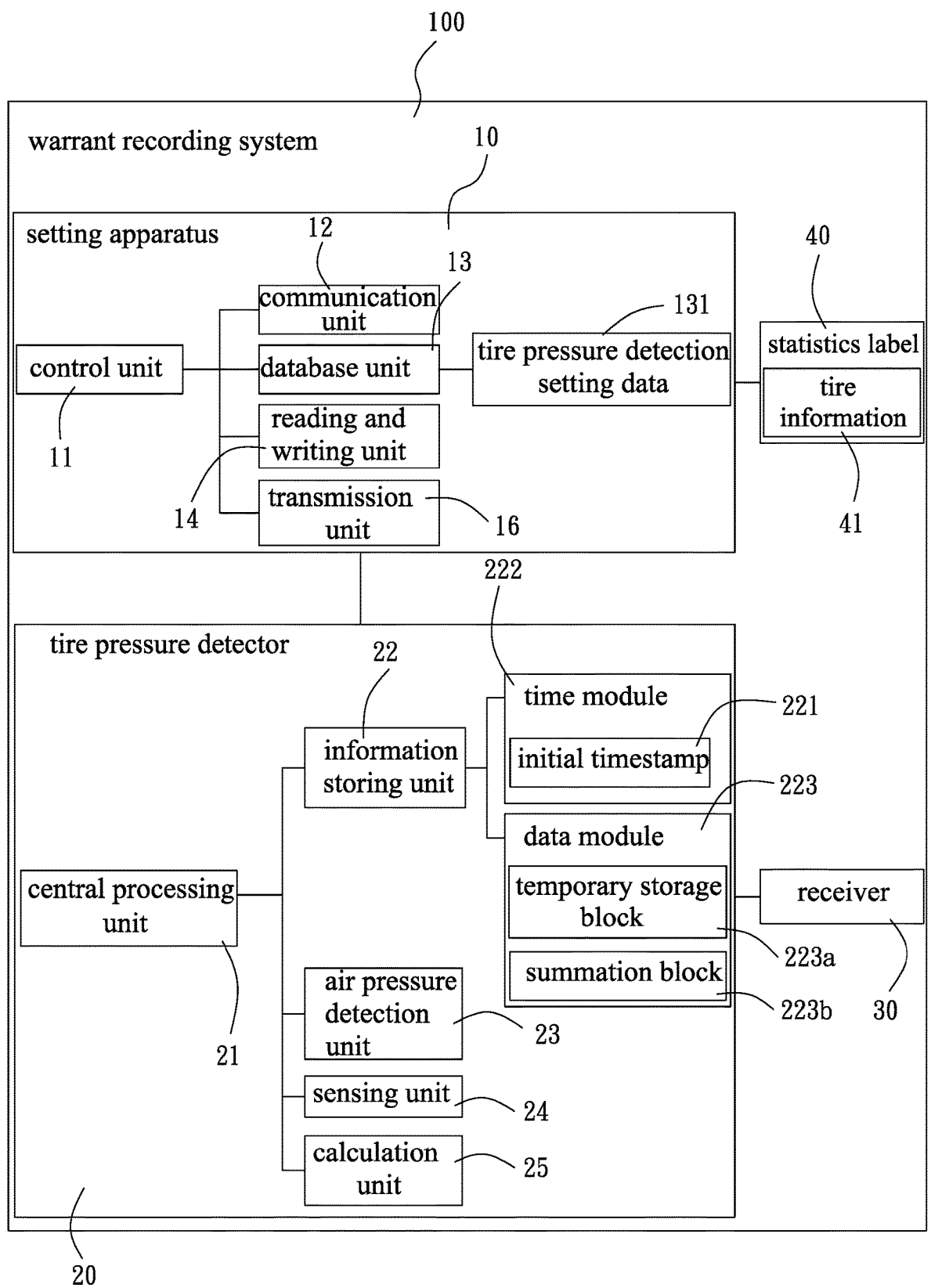
FIG. 7 is a schematic view illustrating the system structure in accordance with another embodiment of the present invention.

Referring to FIG. 7, in still another embodiment of the present invention, the vehicle tire 2 is provided with a statistics label 40, which stores a tire information 41 of the vehicle tire 2. The statistics label 40 is allowed to be an RFID label or bokode. In an embodiment of the present invention, the statistics label 40 refers to an RFID label. The tire information 41 includes the information of the vehicle tire 2, such as the date of manufacture (DOT), the installation position (one of the four wheel positions on the vehicle), the size, and the model of the vehicle tire 2.

Also, the setting apparatus 10 further comprises a transmission unit 16 coupled with the control unit 11. With the transmission unit 16 sensing the statistics label 40, the setting apparatus 10 acquires the tire information 41 in the statistics label 40. The transmission unit 16 sends the sensed tire information 41 to the control unit 11. The control unit 11 is able to send the tire information 41 to the reading and writing unit 14. The reading and writing unit 14 sends the tire information 41 to the central processing unit 21 of the tire pressure detector 20, and the central processing unit 21 saves the tire information 41 to the data module 223 of the information storing unit 22.

Therefore, when the tire pressure detector 20 and the setting apparatus 10 are electrically connected, with the sensing connection between the transmission unit 16 and the statistics label 40, the setting apparatus 10 acquires the tire information 41 in the statistics label 40, and the control unit 11 sends the tire information 41 acquired by the transmission unit 16 to the reading and writing unit 14, and the reading and writing unit 14 saves the tire information 41 in the information storing unit 22. With such configuration, through the sensing transmission between the statistics label 40 and the setting apparatus 10, the tire information 41 is automatically recorded into the tire pressure detector 20, so as to assure that the tire information 41 is accurately set and recorded in the tire pressure detector 20.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A warrant recording system, comprising:
a setting apparatus provided with a communication unit, a control unit, and a reading and writing unit, the communication unit further connected with internet for acquiring a standard time; and
a tire pressure detector signally connected with the setting apparatus, the tire pressure detector including a central processing unit, an information storing unit, and an air pressure detection unit; the central processing unit is coupled with the information storing unit and the air pressure detection unit, wherein the setting apparatus receives the standard time through the communication unit and writes the standard time into the information storing unit through the reading and writing unit, such that an initial timestamp is recorded by the information storing unit and stored in the information storing unit in a read-only form.

2. The warrant recording system of claim 1, wherein the setting apparatus includes a database unit which is coupled with the control unit and stores a tire pressure detection setting data; the setting apparatus receives the standard time through the communication unit, and writes the tire pressure detection setting data and the standard time into the information storing unit through the reading and writing unit; the initial timestamp refers to the corresponding standard time upon the tire pressure detection setting data being written into the information storing unit.

3. The warrant recording system of claim 1, further including a statistics label disposed at a vehicle tire; the statistics label stores a tire information of the vehicle tire; the setting apparatus further includes a transmission unit coupled with the control unit, and the transmission unit is applied for sensing the statistics label for acquiring the tire information.

4. The warrant recording system of claim 3, wherein the control unit sends the tire information to the information storing unit through the reading and writing unit, such that the tire information is stored in the information storing unit.

5. The warrant recording system of claim 4, wherein the information storing unit includes a time module and a data module; the time module stores the initial timestamp, and the data module stores the tire information.

6. The warrant recording system of claim 1, wherein the tire pressure detector is installed on a vehicle tire; the tire pressure detector includes a sensing unit and a calculation unit; the calculation unit is signally connected with the information storing unit; the sensing unit senses a rotation of the vehicle tire during a movement of a vehicle to produce a sense signal, the calculation unit receives the sense signal to calculate and generate a mileage information which is stored in the information storing unit.

7. The warrant recording system of claim 6, wherein the sensing unit is selected from the group consisting of accelerometer and a gyroscope.

8. The warrant recording system of claim 6, wherein the vehicle tire is rotatably disposed at the vehicle, and the vehicle is provided with a receiver; when the vehicle tire rotates, the receiver and the tire pressure detector face each other at a certain position, so as to sense each other and generate the sense signal.

9. The warrant recording system of claim 6, wherein the mileage information is presented in a number value form; the information storing unit includes a temporary storage block and a summation block, such that the calculation unit stores the mileage information in the temporary storage block; when the mileage information is accumulated to reach a predetermined value, the accumulated mileage information is transferred to be saved in the summation block in an arithmetic carry form.

10. The warrant recording system of claim 9, wherein the information storage unit includes a time module and a data module; the time module stores the initial timestamp; the temporary storage block and the summation block are disposed in the data module.

11. A setting apparatus for setting a warrant of a tire pressure detector, comprising:
- a communication unit connected to internet to acquire a standard time;
- a control unit;
- a database unit storing a tire pressure detection setting data; and
- a reading and writing unit;
- the setting apparatus receives the standard time through the communication unit and writes the tire pressure detection setting data and the standard time into the tire pressure detector simultaneously through the reading and writing unit, such that an initial timestamp is recorded in the tire pressure detector in a read-only form, wherein the initial timestamp refers to the corresponding standard time upon the tire pressure detection setting data being written into the tire pressure detector.

* * * * *